July 1, 1958   R. R. PORTER ET AL   2,841,538
CARRIER ELECTROLYTIC PROCESS FOR RECOVERY OF
URANIUM FROM SOLUTIONS THEREOF
Filed Sept. 8, 1950
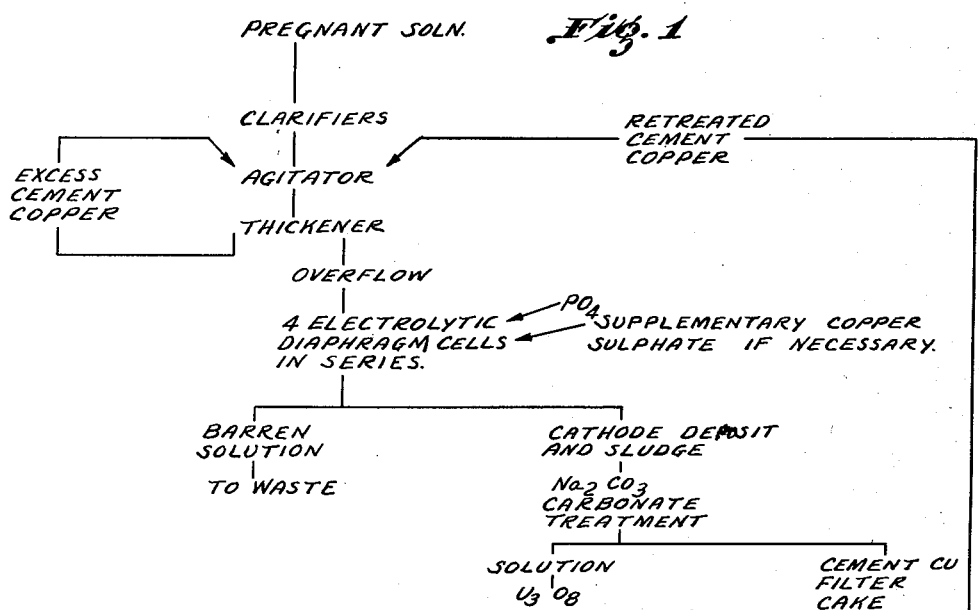
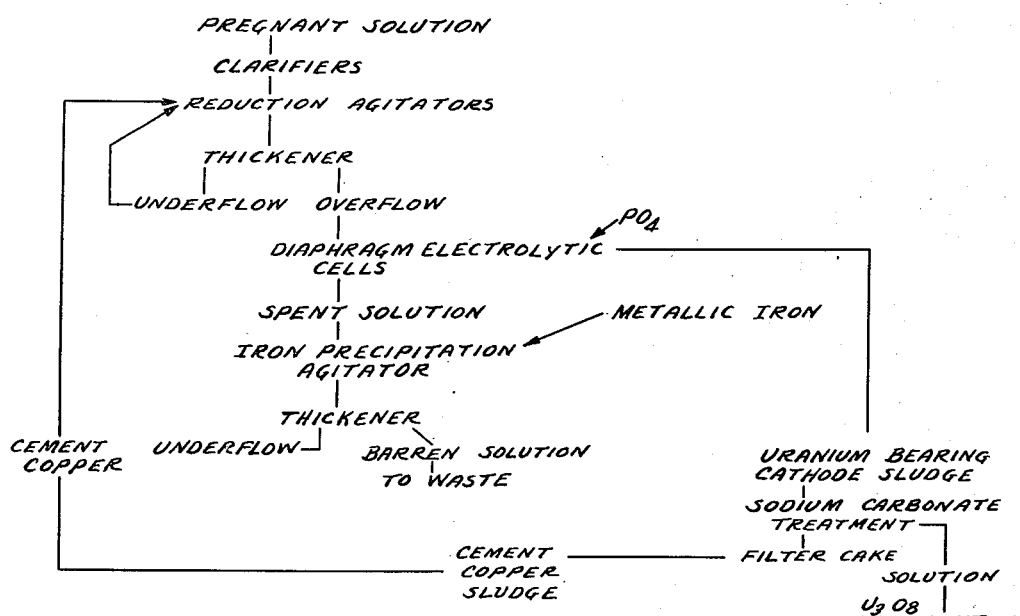
Inventors,
ROBERT RAMPTON PORTER &
EWEN THOMAS PINKNEY
BY
E. F. Wenderoth
Attorney 2,841,538

CARRIER ELECTROLYTIC PROCESS FOR RECOVERY OF URANIUM FROM SOLUTIONS THEREOF

Robert Rampton Porter, Johannesburg, Transvaal, and Ewen Thomas Pinkney, Orkney, Transvaal, Union of South Africa, assignors, by mesne assignments, to the Union of South Africa as represented by the Atomic Energy Board Application September 8, 1950, Serial No. 183,914

Claims priority, application Union of South Africa September 20, 1949

7 Claims. (Cl. 204—1.5)

This invention relates to the separation and recovery of uranium compounds from solutions containing impurities such as are found in the acid leach liquors which are typified by those obtained by the leaching of an uranium-bearing ore with sulphuric acid and ferric sulphate. This invention, however, is not limited by the manner in which the uranium-bearing solutions are obtained or the impurities therein, as it may be utilized on any uranium-bearing solution irrespective of the source, provided that the lixiviants used are such that they will not destroy the necessary apparatus.

Heretofore, the differential separation of uranium from various constituents found in leach solutions has been difficult, requiring expensive chemical reagents, and furthermore the recoveries have not always been satisfactory. The known method of recovering uranium from a leaching solution containing such elements as, aluminum, vanadium, silicon, iron, calcium, magnesia, nickel, cobalt, zinc, manganese, sodium, potassium and others, is to co-precipitate the uranium as a hydroxide together with those elements whose chemical properties are such that they form insoluble hydroxides in the pH range from 2.0 to 6.0. The alkalis commonly used for effecting the precipitations are lime, magnesia, sodium, potassium and ammonium hydroxides. The separation of the uranium from the resultant mixed hydroxide precipitate is, however, costly and requires many purification steps to produce a high grade uranium product, particularly if the solution originally precipitated was derived from a low-grade ore.

Hitherto it has not been considered practicable to separate or produce uranium from uranium-bearing solutions by electrolytic methods because of the impossibility of depositing uranium metal from aqueous solutions, and the great difficulty in producing on a commercial scale, an oxide or hydrated oxide at one of the electrodes.

It has now been found that uranium can in fact be almost completely recovered from aqueous acid solutions by electrolytic methods provided certain conditions and reagents are present during electrolysis.

According to the invention a method or process is provided in which the solution to be treated for the selective recovery of uranium is subjected to electrolysis within a pH range of the order of 0.5 to 6.0 with the aid of cation carriers effective in causing deposition of uranium compound therewith on and/or in the vicinity of the negative electrode.

Such compound of uranium may itself be produced by any suitable anion action in the solution under treatment.

The invention further comprises preparation of the solution to be subjected to electrolysis, by introduction thereto of a carrier metal ion (cation) and/or an anion, e. g. by addition of copper as sulphate and/or phosphate ion ($PO_4$) as $H_3PO_4$. A molar ratio of uranium to phosphate of the order of 1 to 5 is preferred.

The process may comprise two principal and consecutive stages viz. for reduction of ferric iron to ferrous state after introduction of anion, and continued electrolysis after suitable carrier-ion concentration adjustment; whereupon sludge and/or cathode deposit provide the uranium product for subsequent uranium recovery treatment of a simple kind.

It is within the scope of the invention also to employ this electrolytic method as an alternative to or in conjunction with the invention set forth in co-pending U. S. patent application Serial No. 183,913, filed on even date herewith, e. g. for obtaining further uranium recovery from a solution preliminarily treated according to that invention. The latter, briefly stated, discloses the treatment of a uranium-bearing solution with (a) a finely divided adsorbent material, followed by (b) addition of a metallic reducing agent, and (c) by removal of the resultant precipitates from the solution.

Other features of the invention will be clear from the following description which includes specific illustrative examples.

This removal of uranium from solution can be accomplished at any selected point or sub-range within the pH range from 0.5 to 6.0, which range is determined by considerations of avoiding general precipitation conditions on the one hand, and on the other, conditions productive of redissolving. The selected operating pH conditions will depend on the nature of the impurities in the solutions from which the uranium separation is to be made.

The uranium compound which is co-deposited, probably by sorption on the carrier metal surface, may be produced by the presence, if necessary by addition, of any suitable anion which will produce colloidal solutions or suitable conditions in the selected pH range for collection of the uranium. The anions economically suited include phosphates, arsenates, hydroxides and carbonates.

The metal cation used as a carrier may be any of those elements e. g. Cu, Cd, Co, Ni, Au, Ag, Zn, Bi, Sb, As, Fe, which can be electrolytically deposited on the cathode at the pH range selected, and according to the type and/or constitution of the solution from which the uranium is to be recovered.

The electrolytic procedure used in obtaining the uranium precipitate preferably comprises the employment of a diaphragm cell in which the cathode compartment is separated from the anode compartment by a porous ceramic or other suitable membrane. The uranium-bearing solution surrounds the cathode, which may be of any suitable material, e. g. Pb or Cu, whose overvoltage is such that the cation selected as a carrier can be deposited on it in the metallic form. The anode which can also be of any suitable material which will withstand oxidising conditions is surrounded by any electrolyte. The electrodes are connected to any low voltage source of direct current, and when current is passed through the cell a reducing action takes place at the cathode and uranium ions and the metallic carrier ions migrate toward the negative pole. The carrier is deposited as metal, preferably controlled so as to appear in a finely divided state, and during the deposition, entrains or captures the uranium compound. This uranium compound can be recovered from the cathode or from the sludge which drops off the cathode during the electrolysis by removal of the deposition and sludge from the cell. The product thus obtained consists of the metal carrier and a urnaium compound, and contains only very minor amounts of the impurities present in the original solution.

A high grade uranium product may be recovered from the said product by any of several more or less conventional methods which will depend on the type or nature of carrier metal selected to remove the uranium from the solution and the condition in which it deposits.

This invention of selectively removing uranium from solution is illustrated in greater detail in the following examples.

EXAMPLE 1

To illustrate the effect of the addition of a metal carrier ion to a uranium-bearing solution the following two tests were made:

250 ml. of a uranium solution containing 0.85 g. $U_3O_8$ per litre, as sulphate, were electrolyzed for 3 hours in the cathode compartment of a diaphragm electrolytic cell using a sheet lead cathode and a sheet lead anode. The voltage applied amounted to 4 volts and the current density was 24 amps. per square foot.

In Test 1, no additions of any chemicals were made to promote the recovery of uranium. Thes pH of the solution during electrolysis varied from pH 1.15 to pH 2.30. After 3 hours the spent electrolyte or catholyte was withdrawn and filtered and analyzed for uranium.

In Test 2, a similar quantity of the same uranium solution was then placed in the cathode compartment of the cell together with 0.25 g. of Cu which was added as copper sulphate, and electrolysed under exactly the same conditions as previously described. The results of the two tests are given in the following table:

|  | Test No. 1 | Test No. 2 |
|---|---|---|
|  | Test without Cu present | Test with Cu present |
| Assay feed soln. g.p.l. $U_3O_8$ | 0.85 | 0.85 |
| Assay (catholyte) discharge spent electrolyte | 0.400 | 0.0374 |
| Percent $U_3O_8$ removal from feed soln | 52.9 | 95.6 |

EXAMPLE 2

The effect of the cation and anion addition to improve the result is shown in the following two further tests:

In Test 3, the same starting solution as in Example 1 was electrolysed under the same conditions as above, except that to the uranium-bearing solution the equivalent of 0.5 grms. $PO_4$ ion as $H_3PO_4$ were added with no cation carrier. The pH during electrolysis varied from pH 1.15 to 1.80.

In Test 4, the same amount of phosphate was added plus 0.25 gms. Cu as copper sulphate. The results obtained in these further tests are given in the following table:

|  | Test No. 3 | Test No. 4 |
|---|---|---|
|  | With $PO_4$ Alone | With $PO_4$ plus Copper ion |
| Assay fed Solution | 0.85 g. p. l. $U_3O_8$ | 0.85 g. p. l. $U_3O_8$ |
| Assay (catholyte) spent | 0.283 g. p. l. $U_3O_8$ | 0.0094 g. p. l. $U_3O_8$ |
| Electrolyte percent $U_3O_8$ removal | 66.8 | 98.8 |

The above four tests illustrate the beneficial effects of both anion and cation addition to the electrolyte, particularly as respects the cation.

EXAMPLE 3

Separation of uranium from a solution containing other elements.

In Tests 5 and 6 solutions having the following composition were used.

*Test 5.*—The leach solution used was derived from one particular ore and had the following analysis (grams per litre):

| Fe | 7.91 |
|---|---|
| Al | 0.58 |
| $SiO_2$ | 1.01 |
| $PO_4$ | 0.13 |
| Mg | 2.50 |
| Ca | 0.56 |
| S | 33.00 | and a pH of 2.2. Minor constituents of the solution included Co, Ni, Cu, Cr, V, Ti, and the uranium content of the said solution was 0.154 g./l.

*Test 6.*—The composition of the solution derived from another ore had the following analysis (grams per litre):

| Fe | 6.00 |
|---|---|
| Al | 0.6 |
| $SiO_2$ | 0.6 |
| $PO_4$ | 0.11 |
| Mg | 2.53 |
| Ca | 0.60 |
| S | 32.00 | and a pH of 2.0.

Minor constituents included Co, Ni, Cu, Cr, V and Ti, and the uranium content of the solution was 0.0903 g. p. l.

In both these tests the solution formed the catholyte, and enough phosphate ion was added as phosphoric acid to give a molar ratio of uranium to phosphate of 1 to 5. Current was applied using 4 volts and 24 amps. per sq. ft, and electrolysis was continued until a negative test for ferric iron was obtained, because at the cathode any iron present in the original solution as ferric, is reduced to the ferrous state. In both Tests 5 and 6 the iron reduction took approximately 2 hours to complete. At the end of this period Cu as $CuSO_4$ was added to the solution to give a concentration of 1 gram per litre Cu.

The electrolysis was then continued for a period of one hour by which time all the copper had been deposited. The spent electrolyte was withdrawn, filtered and analysed. The cathode deposit which contained copper and uranium was also analysed.

The results are given in the following table:

|  | Test No. 5. | Test No. 6. |
|---|---|---|
| Feed Solution | 0.154 g. p. l. $U_3O_8$. | 0.0903 g. p. l. $U_3O_8$. |
| Spent electrolyte (catholyte) | 0.0026 g. p. l. $U_3O_8$. | 0.0013 g. p l. $U_3O_8$. |
| Final pH spent electrolyte (catholyte) | 1.75 | 1.75. |
| Percent recovery $U_3O_8$ | 98.5 | 98.6. |

Analyses of the precipitates showed that they contained Cu, $PO_4$ and $U_3O_8$ with only very minute quantities of contaminants present in the feed electrolyte.

The following is an example of a complete all-electrolytic process using recycling of the precipitated copper for conservation of reagents. In this process the recycled copper product after uranium removal, has a dual purpose, namely (a) to reduce the ferric iron to the ferrous state and thereby conserve electric current, and (b) to supply the soluble copper necessary for the electrolytic deposition.

The reaction taking place is explained by the following chemical equation:

$$Fe_2(SO_4)_3 + Cu \rightarrow CuSO_4 + 2FeSO_4$$

Four electrolytic cells were used. The first two vessels were an agitator and a settler respectively. The volume of the complete circuit was 2,400 ml.

Cement copper was fed into the agitator to reduce ferric iron and to introduce copper into solution $$Cu + Fe_2(SO_4)_3 = CuSO_4 + 2FeSO_4$$

Unreacted copper was caught in the second vessel. Phosphoric acid and copper sulphate were fed in suitably, i. e., to provide the aforementioned molar ratio and concentration, respectively.

Flow rates of the pregnant solution were varied from 600 ml. per hour to 1,200 ml. per hour. In test P10/6B the cement copper feed was increased from approximately the theoretical quantity necessary to reduce the ferric iron to a five-fold excess, current density was increased and the solution in the cells was agitated with a stream of nitrogen. Results and data are summarised in Table B.

TABLE B

[Series P/10]

|  | 10/6B |
|---|---|
| Head Soln.: |  |
| pH | 2.1 |
| Fe+++ g./l | 0.34 |
| Fe++ g./l | 4.80 |
| Total Fe g./l | 5.14 |
| U$_3$O$_8$ g./l | 0.1847 |
| Duration of Test, hours | 9 |
| Volume treated, ml | 5078 |
| Flow rate, ml./hr | 564 |
| Barren Solution: |  |
| pH | 2.1 |
| Total Fe, g./l | 4.65 |
| U$_3$O$_8$ g./l | 0.0038 |
| Total volume ml. (includes reagents) | 5490 |
| Flow rate, ml./hr | 610 |
| Voltage per cell | 4.5 |
| Amperage per square foot | 6.85 |
| Total cathode area, sq. ft | 0.58 |
| Cu feed as cement Cu., g./l | 1.75 |
| Cu dissolved by ferric iron | 0.20 |
| Cu feed as CuSO$_4$, g./l | 0.60 |
| PO$_4$ feed, g./l | 0.86 |
| Weight of U$_3$O$_8$ in feed, g | 0.938 |
| Weight of U$_3$O$_8$ in barren, g | 0.021 |
| Weight of U$_3$O$_8$ deposited, g | 0.917 |
| Percent Deposition | 97.8 |

The flow sheet on Fig. 1 of the accompanying drawing illustrates this process.

These results indicate the efficiency of the process and show that it can have many applications to the separation of uranium from other elements. It may find particular applications to the recovery of uranium from solutions derived from low-grade and complex ores, and also be applied with adaptations or adjustments to the separation and/or plutonium from other reaction products resulting from the operation of the atomic pile.

As already indicated electrolytic methods of the kind described may be applied as an alternative to, or in combination with methods according to the aforementioned co-pending patent application. For example, the latter may deal particularly with the ferric-iron reduction and partial extraction of uranium from the pregnant solution, the effluent becoming the solution for electrolytic treatment as hereinbefore described, if only for scavenging purposes. Initial and running costs of the respective processes and other factors such as the importance or unimportance of by-products, may determine the economical worth of such a combination, and the shares to be borne by the respective processes in the overall recovery. Singly or in combination the said two processes may be arranged for continuous or cyclic operation, e. g. returning effluent and/or part-spent liquors if necessary through regenerative stages to earlier stages, as may make for a high plant efficiency.

The flow sheet shown on Fig. 2 of the drawings is illustrative of a combined process embodying the subject of our co-pending patent application and the substance of the present invention.

What we claim is:

1. A process for the selective preparation and recovery of uranium compound from a solution containing uranium values, which comprises subjecting the solution to be treated to electrolysis within a pH range of about 0.5 to 6.0 in the presence in the solution being electrolyzed of a cation carrier selected from the group consisting of Cu, Cd, Ni, Au, Ag, Zn, Bi, Sb, As and Fe cations and also of an anion selected from the group consisting of phosphate, arsenate, hydroxide and carbonate ions, whereby said cation is deposited at the negative electrode in free form as finely divided metal and, concomitantly therewith, the uranium is deposited in combined form as uranium compound.

2. A process according to claim 1, wherein the molar ratio of uranium to anion in said solution is about 1 to 5.

3. A process according to claim 1, wherein the cation is the copper ion and the anion is the phosphate ion, and the molar ratio of uranium to phosphate ion in said solution is about 1 to 5.

4. A process according to claim 1, wherein the said solution also contains ferric iron, and wherein the cation carrier is cationic copper, whereby the aforesaid depositions are preceded by reduction of the ferric iron to ferrous iron.

5. A process according to claim 1, wherein the pH of the solution during electrolysis varies from about 1.15 to about 2.30.

6. A process according to claim 1, wherein the pH of the solution during electrolysis varies from 1.15 to 1.80, the cation carrier is Cu, and the initial solution also contains phosphate anion.

7. A process according to claim 1, wherein the pH of the solution during electrolysis varies from 1.75 to 2.0, the cation carrier is Cu, and the initial solution also contains phosphate anion.

References Cited in the file of this patent

Nichols: "Electrolytic Reduction of Uranyl Ion," U. S. Atomic Energy Commission declassified document MDDC–658, 10 pages, 4 drawings. Declassified Jan. 29, 1947.

Bennett: "The Volumetric Determination of Uranium in Highly Ferriferous Ores," Journal of the Am. Chem. Soc., vol. 56, pages 277–280 (1934) (pages 277 and 288 particularly relied upon).